Figure 1:
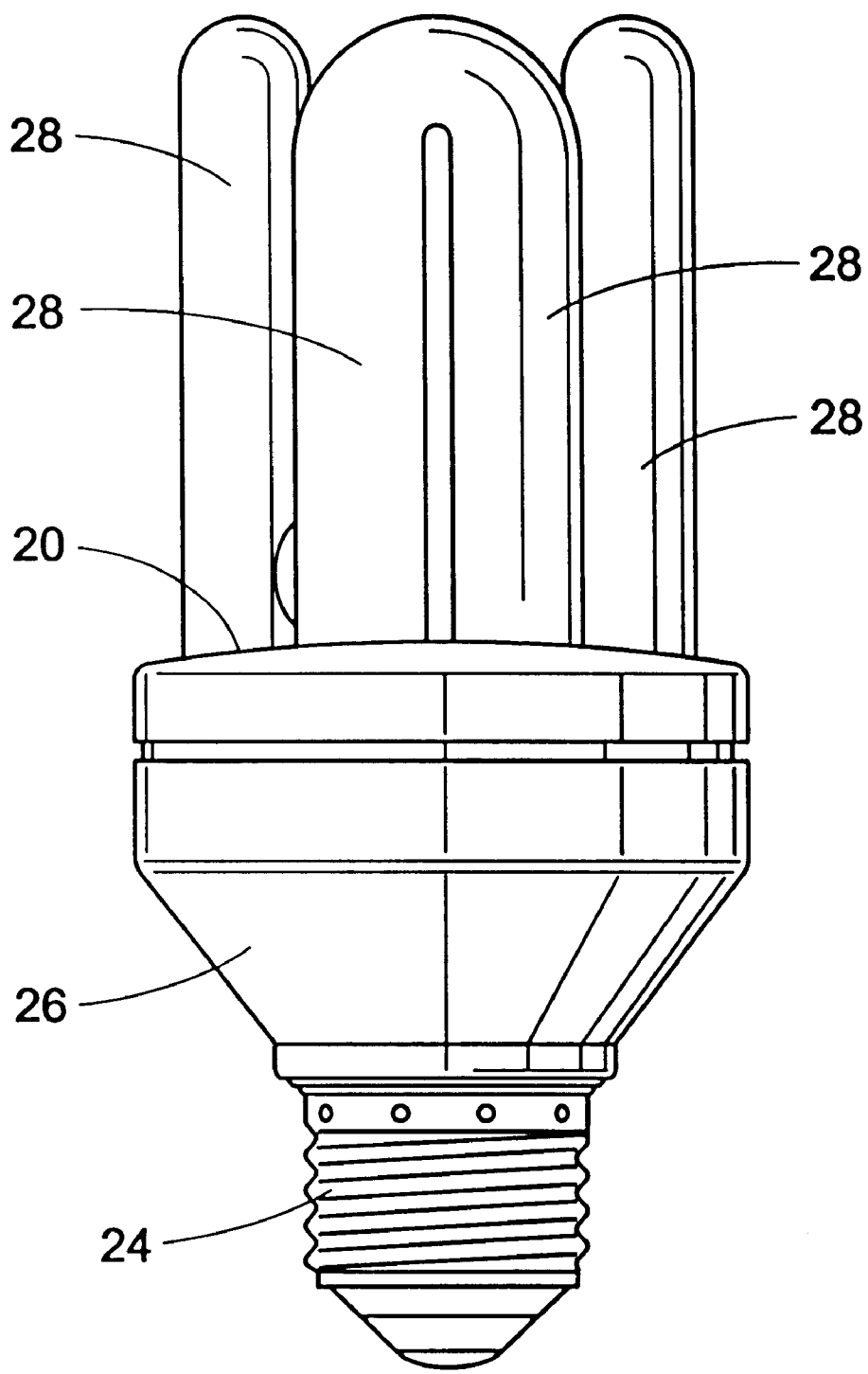

United States Patent
Ocsovai et al.

[11] Patent Number: 6,116,754
[45] Date of Patent: Sep. 12, 2000

[54] COMPACT FLUORESCENT LAMP WITH INTERNAL CONNECTIONS

[75] Inventors: Ákos Ocsovai; Ferenc Papp; József Fülöp; István Würsching, all of Budapest, Hungary

[73] Assignee: General Electric Company, Schenectady, N.Y.

[21] Appl. No.: 09/203,296

[22] Filed: Dec. 1, 1998

[30] Foreign Application Priority Data

Dec. 22, 1997 [HU] Hungary ................................ 9702526

[51] Int. Cl.$^7$ ................................................ F21K 27/00
[52] U.S. Cl. .................... 362/260; 362/216; 313/318.09; 313/318.12; 313/634
[58] Field of Search ................................ 362/260, 216; 313/487, 493, 318.01, 318.05, 318.09, 318.12, 634

[56] References Cited

U.S. PATENT DOCUMENTS

| | | | |
|---|---|---|---|
| 5,086,249 | 2/1992 | Blaisdell et al. | 313/318 |
| 5,585,688 | 12/1996 | Dekleine | 313/318.01 |
| 5,627,433 | 5/1997 | Fulop et al. | 315/56 |
| 5,629,581 | 5/1997 | Belle et al. | 313/318.2 |

*Primary Examiner*—Sandra O'Shea
*Assistant Examiner*—Ronald E. DelGizzi
*Attorney, Agent, or Firm*—Fay, Sharpe, Fagan, Minnich & McKee, LLP

[57] ABSTRACT

This invention relates to compact fluorescent lamps, and, more particularly, to the construction of connections inside the compact fluorescent lamp. The compact fluorescent lamp has a base (24), the base is connected to a housing (26) including a ballast circuit (18). The housing (26) is separated from the fluorescent tube (28) by a cap (20) on the side of the housing opposite to the base (24) and current feedthrough wires (2, 4) protrude from the fluorescent tube (28) inside the housing (26). The electrical connections between the current feedthrough wires (2, 4) and the lead-out wires (3, 5) of the ballast circuit and/or the junction lead-out wires of the base (24) are made by welding the corresponding wires together through metal connection elements (14).

4 Claims, 3 Drawing Sheets

COMPACT FLUORESCENT LAMP WITH INTERNAL CONNECTIONS

This invention relates to compact fluorescent lamps, and, more particularly, to the construction of connections inside the compact fluorescent lamp.

Several internal electrical connections have to be made in these compact fluorescent lamps. Thus for example, the main conductors leading in the main voltage through the contacts of the base, the lead-out wires of the ballast circuit converting the main voltage to an operation voltage suitable for the fluorescent lamp, and the current feedthrough wires supplying current from the fluorescent lamp to the electrodes, all have to be connected appropriately.

Several ways of connecting the internal conductors are known. One solution is that the current feedthrough wires embedded in the fluorescent lamp at its electrodes are connected by soldering to solder tabs formed on the printed circuit board of the ballast circuit. This solution has the disadvantage that the current feedthrough wires embedded in the fluorescent lamp must be made of a solderable material and this requirement means a further restriction, since the material of the current feedthrough wires embedded in the fluorescent lamp in a gas-tight manner must also meet several other requirements. A soldered joint is generally not sufficiently reliable and the operation of soldering may damage the printed circuit board which, in turn, increases the manufacturing shrinkage. It is difficult to automate the operation of soldering in lampmaking, thus the soldering process mostly requires a manual operation with careful control. An insufficiently soldered joint often emerges as a failure only after shipment and when the lamp has already been put on the market or has got into the hands of the customer, which impairs the reliability of the lamp.

Another solution is so-called wire-wrapping in which one of the conductors to be connected is tightly wound over the other conductor using it as a mandrel in a purpose-made manual device. Choosing the right materials, the two connected metals are in effect compression welded to each other which means a reliable connection. However, the wire-wrapping has a disadvantage in that it is difficult to automate this process which thus requires manual operation increasing the manufacturing cost. It has a further disadvantage of requiring long wire and, at the same time, the hazard of wire break exists.

A further way of connection is so-called crimping in which the wire portions to be connected are bent one over the other and the portions are joined by pressing. This way of connection requires a large amount of space which is disadvantageous due to the need of decreasing sizes and to automate this process is also difficult.

According to another way of connection, connection components narrowing in a V-shape and having slightly resilient slits are fixed to a printed circuit board of the ballast, and the wires to be connected are pressed into these slits. Such a solution is disclosed in U.S. Pat. No. 5,629,581 wherein a narrow wire seat is formed in the middle of a cap from the material thereof. The wires are placed in the seats and after inserting the printed circuit board of the ballast, the slits fixed to the printed circuit board force the wires into their places. This solution has the disadvantage that the wires and their V-shaped slits have to be positioned very precisely in order to have a perfect connection, and the connection elements and the seats positioning the wires take a relatively large space inside the housing although sizes have to be continuously decreased.

U.S. Pat. No. 5,627,433 provides a similar solution for the internal connection in which tubular rivets are fixed in the printed circuit board, the tube portion of the rivet protrudes from the board and has a V-shaped slit. The wires to be connected are pressed into these slits. In this solution, it is even more difficult to introduce the wires precisely into the V-shaped slit than in the case of the previous solution, and, at the same time, the reliability of connection is doubtful and the production shrinkage is relatively high. The protruding tube portion of the rivet ensuring at least four connections takes much space within the housing.

Thus there is a particular need for connections inside the housing of the compact fluorescent lamp s which at least decrease or eliminate the disadvantages of t he above known solutions, and, at the same time, ensure reliable connections, eliminate the possibility of short circuit as much as possible, can be easily automated and fix the connected wires in their positions.

The present invention provides a compact fluorescent lamp which has a base; the base is connected to a housing including a ballast circuit. The housing is separated from the fluorescent tube by a cap on the side of the housing opposite to the base and current feedthrough wires protrude from the fluorescent tube inside the housing. The electrical connections between the current feedthrough wires and the lead-out wires of the ballast circuit and/or the junction lead-out wires of the base are made by welding the corresponding wires together through metal connection elements.

Figure 2:
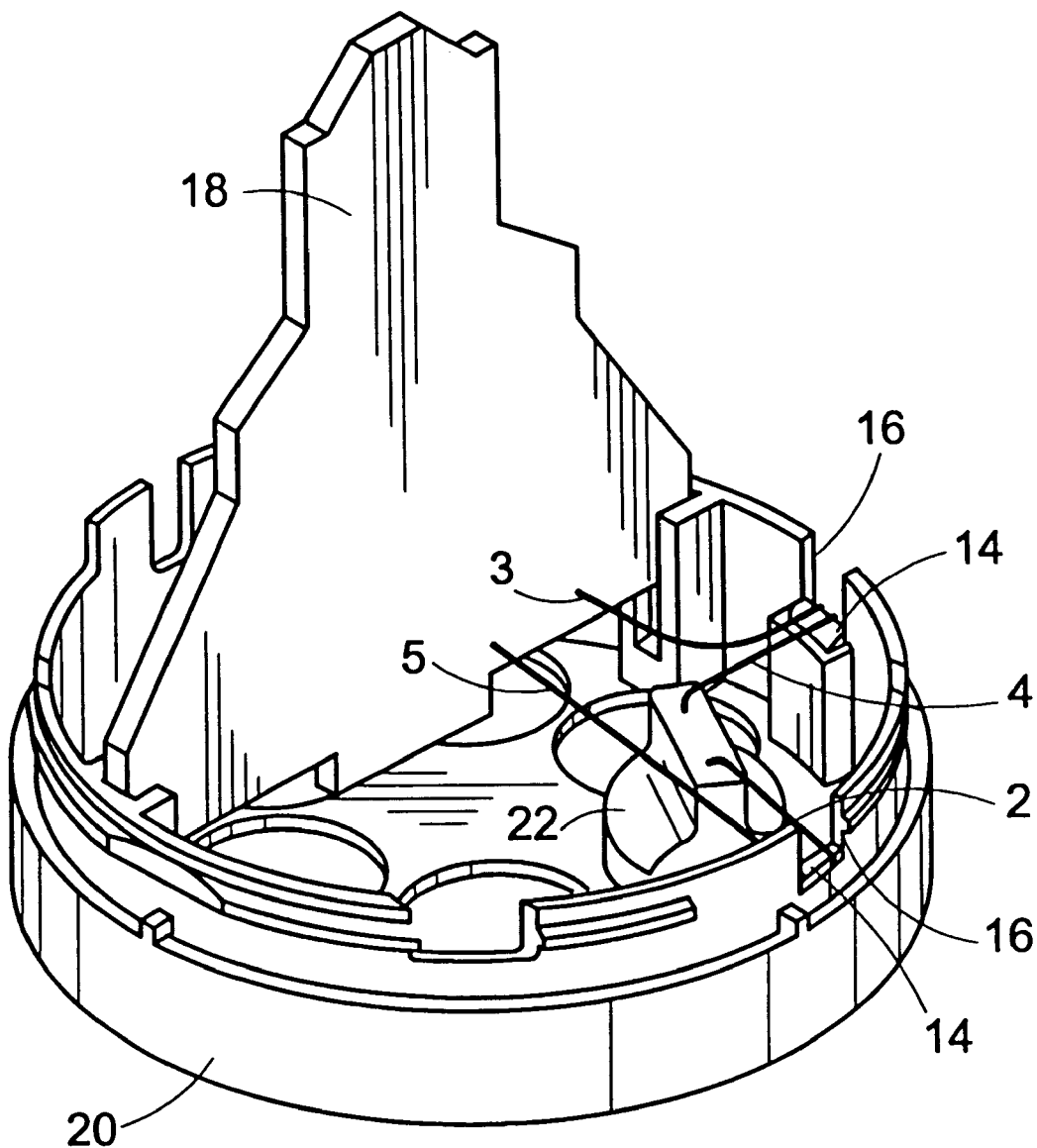
Figure 3:
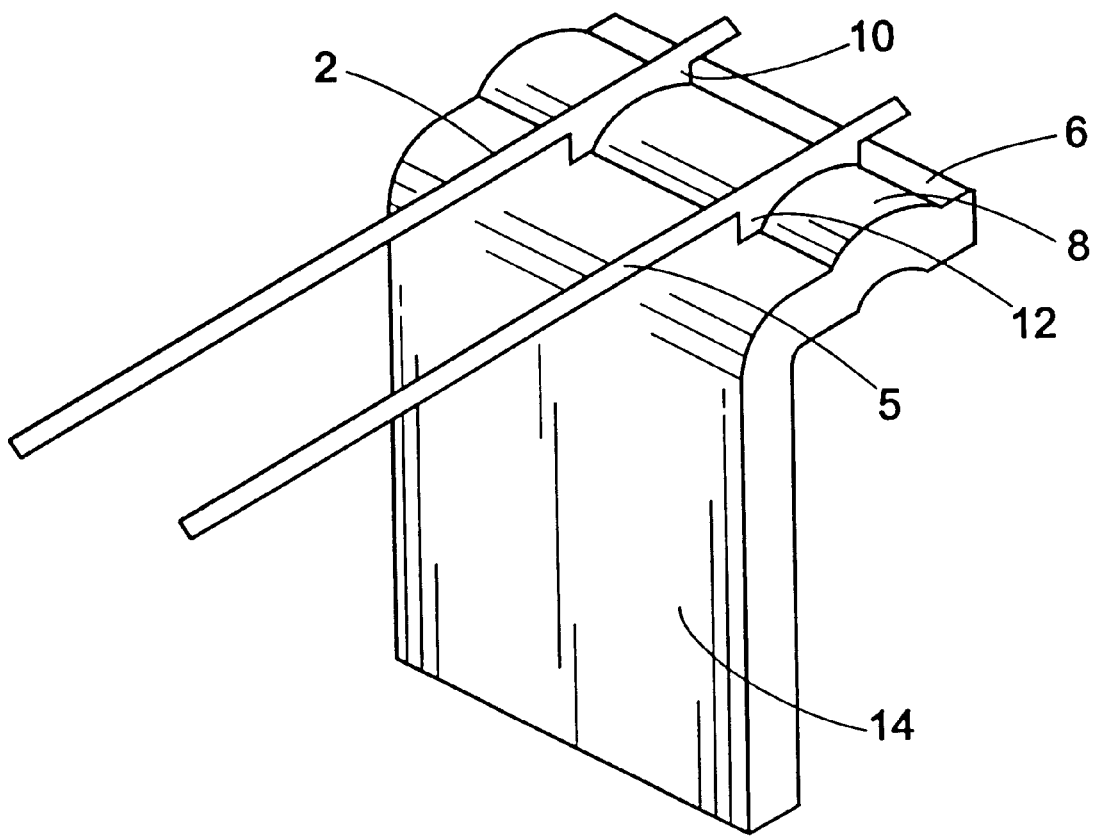

The compact fluorescent lamp according to the invention will be described in detail in the following by an exemplar y embodiment shown in the drawings where FIG. 1 is a side view of a compact fluorescent lamp having a base and a housing, FIG. 2 illustrates a cap of the compact fluorescent lamp shown in FIG. 1, separating the housing from the fluorescent tube, and the connections formed in the housing, FIG. 3 shows an exemplary embodiment of a welded joint.

In FIG. 1, a compact fluorescent lamp having a fluorescent tube 28, a housing 26 closed by a cap 20 and, according to the example, a screw base 24 is seen in side view. The compact fluorescent lamp is connected electrically to the mains through the base known in the art, and wires coming from the connection portions of the base are connected to a ballast circuit arranged inside the housing 26 and/or to electrodes of the fluorescent tube 28.

A detail of the inside of the housing 26 is seen in FIG. 2 where the components are seen viewed from the inner side of the cap 20. One pinched end 22 of the fluorescent tube 28 embedding the current feedthrough wires 2, 4 protrudes inside the housing 26 through an opening formed in the cap 20. Of course, the fluorescent tube 28 also has a second pinched end embedding current feedthrough wires at the other end of the fluorescent tube 28 which second pinched end also protrudes inside the housing through the cap 20, but this is not shown in FIG. 2 for simplicity. A ballast circuit 18 is also placed in the housing 26 to convert the main voltage to the voltage suitable for operating the fluorescent tube 28. This ballast circuit 28 is also mounted on the cap 20, on the side facing the housing 26.

The supply voltage of the fluorescent tube 28 provided by the ballast circuit 18 appears on lead-out wires 3, 5. In the same way, the supply voltage connected to the feedthrough wires at the other end of the fluorescent tube 28 appears on another pair of lead-out wires (not shown in the drawing). In order to apply the supply voltage appearing on the lead-out wires 3, 5 to the feedthrough wires 2, 4 in the pinched end 22, they must be connected to each other. This connection is ensured by a connection element 14 constructed and used according to the invention.

In the exemplary embodiment shown, the connection element 14 is fixed to the cap 20 in its peripheral region on the inner side of its rim. The enlarged drawing of the connection element 14 is seen in FIG. 3. The shape of the connection element 14 permits the fixing of this connection element to the cap 20, and also ensures that the feedthrough wires 2 and 4 can be connected to the lead-out wires 5 and 3, respectively, through this connection element by welding.

For the welded joint, the connection element 14 has a flat surface 6. A rib 8 is formed substantially in the middle portion of this flat surface 6. The rib 8 extends in a direction crossing the direction of the feedthrough wire 2 and the lead-out wire 5 to be connected to each other. The rib 8 ensures seats for the feedthrough wire 2 and the lead-out wire 5 on the connection element 14 and also provides contact points for the welded joints 10 and 12.

The welded joints 10, 12 are preferably made by electrical spot welding during which one of the electric poles is connected to the connection element 14, and the other is connected to the welding electrode or jaw pressed from above on the feedthrough wire 2 and the lead-out wire 5 placed in crosswise direction on the rib 8 of the connection element 14.

As seen in FIG. 2, slits 16 are made in the rim of the cap 20 in the region of the connection elements 14 to ensure that the spot welding electrode can be pressed from outside on the wires 2, 5 and 3, 4 placed on the rib 8 of the connection element 14, due to which the manufacturing process can be simplified and automated.

The welded joint according to the invention is advantageous in respect of mass-production. Spot welding equipment is used in many processes of lampmaking which makes the use of this equipment preferable also in producing the welded joints according to the invention. The use of the welded joint according to the invention is also advantageous because it is not necessary that the wires are precisely positioned on the rib formed on the connection element and positioning the wires consequently does not require the use of a demanding and expensive technology which is also a factor reducing the costs. In addition, the welded joint is a very reliable connection. It is a further advantage that the connection element is fixed to the cap, which decreases the hazard of short-circuit.

What is claimed is:

1. A compact fluorescent lamp comprising a base connected to a housing including a ballast circuit, the housing is separated from a fluorescent tube by a cap on a side of the housing opposite to the base, current feedthrough wires protrude from the fluorescent tube inside the housing wherein electrical connections between the current feedthrough wires and lead-out wires of the ballast circuit are made by welding corresponding wires together through a metal connection element.

2. The compact fluorescent lamp of claim 1 wherein the connection element has a substantially flat surface on which a rib is formed in a direction at least approximately crosswise to the direction of the current feedthrough and lead-out wires connected to the rib by welding.

3. The compact fluorescent lamp of claim 1 wherein each connection element is fixed to the cap in a peripheral region thereof and a slit (16) ensuring access to the connection element (14) is formed in the cap (20).

4. A compact fluorescent lamp comprising:
   a base connected to a housing including a ballast circuit having lead-out wires;
   a fluorescent tube having current feedthrough wires protruding therefrom;
   metal connection elements interconnecting the current feedthrough wires of the fluorescent tube with the lead-out wires of the ballast circuit by welding, the metal connection elements having substantially flat surfaces on which a rib is formed in a direction at least approximately crosswise to the direction of the current feedthrough and lead-out wires connected to the rib by welding; and
   a cap separating the housing from the fluorescent tube on a side of the housing opposite to the base, each connection element being fixed to the cap in a peripheral region thereof and a slit ensuring access to the connection element being formed in the cap.

\* \* \* \* \*